April 23, 1940.  C. C. FARMER  2,198,030
BRAKE CONTROL MEANS
Filed July 29, 1938
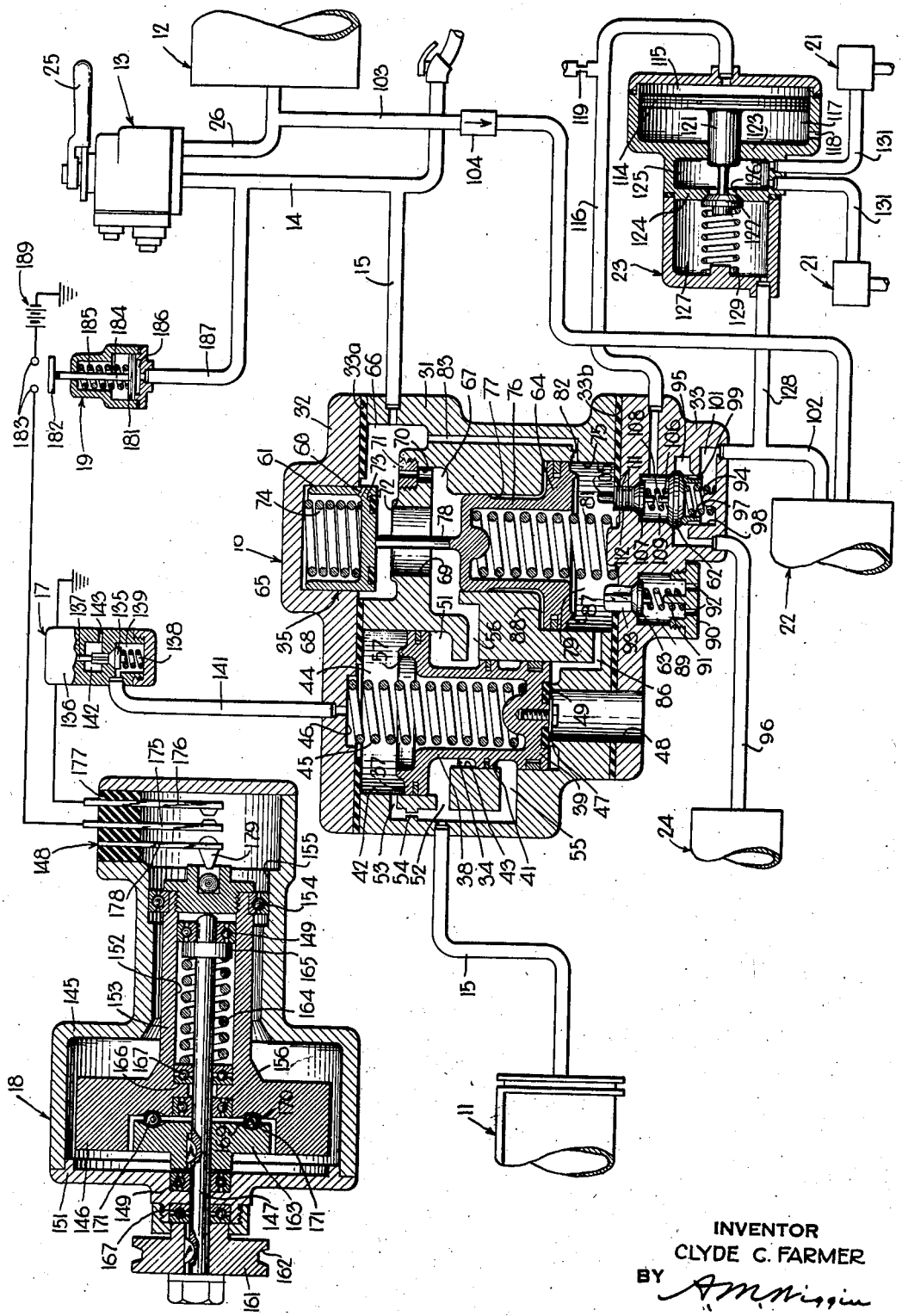
INVENTOR
CLYDE C. FARMER
BY
ATTORNEY Patented Apr. 23, 1940

2,198,030

UNITED STATES PATENT OFFICE 2,198,030

BRAKE CONTROL MEANS

Clyde C. Farmer, Pittsburgh, Pa., assignor to The Westinghouse Air Brake Company, Wilmerding, Pa., a corporation of Pennsylvania Application July 29, 1938, Serial No. 221,951

9 Claims. (Cl. 303—21)

This invention relates to brake control means for vehicles, such as railway cars or trains, and particularly to brake control means adapted to function automatically in response to the slipping of an individual wheel and axle unit for releasing the brakes on the slipping wheels to prevent sliding thereof and for controlling the reapplication of the brakes on the slipping wheel.

As is well known, when the brakes associated with a vehicle wheel are applied with sufficient force to exceed the limit of adhesion between the tread or rim of the wheel and the road or rail surface, the wheel rapidly decelerates toward a locked or non-rotative condition. If the braking force on a slipping vehicle wheel is rapidly reduced at the instant the wheel begins to slip, the vehicle wheel will cease to decelerate and accelerate back toward a rotative speed corresponding to vehicle or rail speed without actually reaching the locked or non-rotative condition.

For convenience, the term "slip" or "slipping" is applied herein to the rotation of a vehicle wheel at a speed less than a rotative speed corresponding to vehicle or rail speed at a given instant, whether the wheel is decelerating or accelerating. The term "slide" or "sliding" is employed herein to designate the dragging of the vehicle wheel along a road surface or rail in a locked or non-rotative state. Thus it should be understood that a slipping wheel is one that is rotating whereas a sliding wheel is one that is not rotating.

If the brakes on a slipping wheel are reapplied while the wheel is accelerating back toward vehicle or rail speed following the automatic release of the brakes and a sufficient degree of application is attained, the wheel may again decelerate toward a locked or non-rotative state. In order to prevent, as much as possible, repeated slipping cycles, it is desirable to avoid reapplying the brakes on a slipping wheel until it returns fully to a speed corresponding to vehicle speed. For the same reason, it is also desirable not to restore the original degree of application of the brakes which initiates slipping of a wheel.

In my prior copending application, Serial No. 209,648, filed May 24, 1938, and assigned to the assignee of this application, there is disclosed an equipment for effecting the above desirable objectives. In my prior application, Serial No. 209,648, an arrangement is provided whereby reapplication of the brakes on a wheel following slipping thereof is controlled automatically by brake cylinder pressure so as to insure prevention of reapplication of the brakes until the brake cylinder pressure has reduced below a predetermined low pressure, the time required for such reduction in brake cylinder pressure being longer than the time required for the slipping wheel to accelerate back to vehicle or rail speed. This prior application also discloses an arrangement which is normally ineffective to restrict the rate of supply of fluid under pressure to a brake cylinder and which is automatically conditioned when a vehicle wheel slips so as to restrict the rate of resupply to the brake cylinder effected after the slipping wheel returns fully to the vehicle or rail speed.

My present invention is adapted to accomplish the same desirable objectives as the arrangement disclosed in my prior application but by simplified and improved means.

It is possible that even with controlled reapplication of the brakes following a slipping wheel condition, recurrence of wheel slipping may occur in cases where the adhesion or rolling friction between a vehicle wheel and the rail is very low. In order therefore, to further insure against recurrent slipping cycles, my invention further includes an arrangement for automatically effecting sanding of the rails, and a consequent improvement in the adhesion between the wheel and the rail, upon initiation of slipping of a wheel and for automatically terminating the sanding after a predetermined lapse of time.

My invention includes a control valve mechanism of novel construction adapted to effect the release of the brakes in response to a wheel slipping condition, to prevent reapplication of the brakes until the brake cylinder pressure reduces below a certain uniform low pressure, to control the rate of reapplication, and to control automatic sanding of the rails.

It is accordingly an object of my invention to provide a fluid pressure brake equipment for vehicles, such as railway cars or trains, and including novel means for instantly and rapidly releasing the brakes on a wheel that begins to slip to prevent sliding of the wheel, and also for preventing the reapplication of the brakes on the slipping wheel until it returns completely to vehicle or rail speed.

Another object of my invention is to provide a fluid pressure brake equipment of the character indicated in the foregoing object and including means, normally ineffective to control the rate of reapplication of the brakes, adapted to be rendered effective, when a wheel slips, to control the rate of reapplication of the brakes on the slipping wheel.

A further object of my invention is to provide a control valve mechanism of novel construction and arrangement adapted to effect the release of the brakes from and to control the reapplication of the brakes on a wheel which slips.

The above objects, and other objects of my invention which will be made apparent hereinafter, are attained by means of an embodiment of my invention subsequently to be described and shown in the single figure of the accompanying drawing.

Description of equipment

The equipment comprising one embodiment of my invention, as shown in the single figure in the accompanying drawing, includes one or more brake cylinders 11 for effecting application and release of the brakes associated with an individual wheel and axle unit or a plurality of wheel and axle units, not shown, a source of fluid under pressure hereinafter called the main reservoir 12, a manually operable self-lapping brake valve 13, a straight-air pipe 14 the pressure in which is controlled by the brake valve 13, a brake cylinder pipe 15 through which fluid under pressure is supplied from the straight-air pipe 14 to the brake cylinder 11, a control valve mechanism 16 interposed in the brake cylinder pipe 15 and controlled by a magnet valve device 17 and a wheel-slip responsive device 18 of the rotary inertia type associated with the same wheel and axle unit as is the brake cylinder 11. The equipment further comprises a pressure operated switch 19, a plurality of sanding devices 21, a sanding reservoir 22, a sanding control valve device 23 and a timing reservoir 24 for timing the operation of the sanding control valve device 23.

Considering the parts of the equipment in greater detail, the brake valve 13 is of the type described and claimed in Patent No. 2,042,112 of Ewing K. Lynn and Rankin J. Bush. In view of the detailed description given in the patent, a functional description of the brake valve 13 is deemed sufficient for the purposes of the present application. When the operating handle 25 of the brake valve 13 is in its normal release position, the brake valve is conditioned to vent the straight-air pipe 14 to atmosphere. When the handle 25 is shifted horizontally out of its normal release position into a so-called application zone, the brake valve is conditioned to establish communication through which fluid under pressure is supplied from a supply pipe 26, connected to the main reservoir 12, to the straight-air pipe 14, the brake valve being automatically self-lapping to establish a pressure in the straight-air pipe 14 substantially proportionate to the displacement of the operating handle 25 out of its normal release position.

Should the pressure in the straight-air pipe 14 tend to reduce due to leakage or for other reasons, from a pressure corresponding to the position of the operating handle, the brake valve is automatically operative to supply further fluid under pressure to the straight-air pipe to restore and maintain a pressure therein corresponding to the position of the brake valve handle. This pressure maintaining feature of the brake valve 13 is of importance in connection with the reapplication of the brakes as will be described hereinafter. It should be understood that the straight-air pipe 14 comprises pipe sections carried respectively on all cars of a train and connected through suitable hose couplings between the cars in conventional manner.

The control valve mechanism 16 comprises a casing having a main section 31 and two end or cover sections 32 and 33, respectively, adapted to be secured to the main section 31 in sealed relation by gaskets 33a and 33b, and suitable screws or bolts, not shown. Embodied in the casing of the control valve mechanism 16 are a release and reapplication valve device 34 hereinafter referred to as the release valve device, and valve device 35 for controlling the rate of resupply of fluid under pressure to the brake cylinder and hereinafter referred to as the reapplication control device.

The release valve device 34 comprises an annular piston 37 having a tubular stem 38, extending to one side thereof, the outer end of which is closed and formed as a piston valve 39, hereinafter designated the vent valve. Also formed on the outside of the hollow stem 38 at a point between the vent valve 39 and the piston 37 is a piston 41. The piston 37 operates in a suitable bore 42 formed in the casing section 31 and the vent valve 39 and piston 41 operate in a bore 43 of smaller diameter than the bore 42 and in coaxial alignment therewith.

The bore 42 opens at the face of the casing section 31 covered by the end section 32, a chamber 44 being thus formed between the piston 37 and the casing section 32 at the upper side of the piston 37. Interposed between the end casing section 32 and the piston 37 within chamber 44 is a coil spring 45, one end of which engages in a suitable recess 46 in the casing section 32 and the other end of which is received in and bears against the closed end of the hollow stem 38 of the piston 37. The spring 45 normally yieldingly urges the piston 37 downwardly to effect seating of the vent valve 39 on an annular rib seat 47 which surrounds an exhaust port 48. An annular gasket 49 is inset in the face of the vent valve 39 for effecting sealing engagement with the annular rib seat 47.

Formed in the casing section 31, between the pistons 37 and 41 of the release valve device 34 and in surrounding relation to the stem 38, is an annular chamber 51 to which the brake cylinder 11 is connected through a passage 52 and one section of the brake cylinder pipe 15. Chamber 51 communicates with the chamber 44 above the piston 37, when the piston 37 is in its normal position shown, through a branch passage 53 of the passage 52, the passage 53 containing a restriction or choke 54. Another branch passage 55 of the passage 52 opens into the bore 43 at a point immediately above the vent valve 39 when the vent valve 39 is seated on its annular rib seat 47.

The choke 54 is of such size that when fluid under pressure is supplied into the annular chamber 51 and thus to the brake cylinder 11, in the manner to be hereinafter described, chamber 44 at the upper side of the piston 37 becomes sufficiently rapidly charged through the choke 54 that the spring 45 is effective to exert a sufficient force on the piston 37 to maintain the vent valve 39 seated on its annular rib seat 47. With the annular chamber 51 and brake cylinder 11 charged with fluid under pressure, a sudden reduction of the pressure of the chamber 44, as by venting in the manner hereinafter described, creates a sufficient differential fluid pressure force on the piston 37 to cause it to be shifted upwardly against the yielding resistance of spring 45 until an annular rib 56 formed on the upper face of the piston 37 engages a portion of the gasket 33a between the casing sections 31 and 32, which serves as a gasket seat.

When the piston 37 is shifted upwardly into seated relation on gasket 33a, the vent valve 39 is shifted upwardly to a sufficient degree to establish communication between the passage 55 and the exhaust port 48 whereby fluid under pressure is rapidly released from the brake cylinder 11. At the same time, the piston 41 closes communication from a passage 56, into which fluid under pressure is supplied as hereafter described, and the annular chamber 51. In shifting from its normal position to its upper seated position on the gasket 33a, the piston 37 passes the opening of the passage 53 into the chamber 44 and thus the chamber 44 at the upper side of the piston is isolated from the brake cylinder. Accordingly, as long as the chamber 44 is maintained vented, and the pressure in the brake cylinder 11 is effective to exert a sufficient force in chamber 51 on the lower side of the piston 37 to overcome the spring 45, the piston 37 remains in its upper seated position. Spring 45 is of such strength that when the pressure in the brake cylinder acting to maintain the piston 37 in its upper seated position reduces to a certain uniform low pressure, such as five pounds per square inch, the spring becomes effective to shift the piston 37 downwardly to reseat the vent valve 39 on its annular rib seat 47 and restore the connection between the supply passage 56 and the annular chamber 51.

The reapplication control device 35 comprises a valve piston 61, a valve 62 hereinafter called the sanding valve, and an exhaust valve 63, all of which are arranged to be operated by a piston 64.

The valve piston 61 of the reapplication control device 35 is guided in a suitable bore 65, formed in the casing section 32, and extends into a chamber 66 in the casing section 31 which is constantly connected through another section of the brake cylinder pipe 15 to the straight-air pipe 14. A suitable breather port 60 is provided in the valve piston 61 to prevent dash-pot action thereof. Separating the chamber 66 in the casing section 31 from another chamber 67 out of which leads the supply passage 56, previously referred to, is a wall 68 and communication between the two chambers through the wall is provided by a relatively large bore or passage 69 and a relatively small passage 70 having a choke element 71 therein. An annular rib seat 72 is formed on the wall 68 in surrounding relation to the bore 69, and the valve piston 61 is adapted to seat on rib-seat 72 to close communication through the passage 69 from the chamber 66 to the chamber 67, thereby restricting communication between the chambers to the passage 70 containing the choke element 71. An annular gasket 73 is inset in the face of the valve piston 61 for effecting sealing engagement with the annular rib seat 72. Interposed between the casing section 32 and the back side of the valve piston 61 is a coil spring 74 which is effective to urge the valve piston 61 downwardly toward seated relation on the annular rib seat 72.

The piston 64 operates in a suitable bore 75 in the casing section 31 and has a hollow stem 76, projecting to one side of the piston and closed at the outer end thereof, which stem operates in a suitable bore 77 that opens into the chamber 67 and is of smaller diameter than the bore 75. Formed at the outer closed end of the hollow stem 76 is a pin 78 which projects upwardly through the chamber 67 and passage 69 into the chamber 66 where it engages the seating face of the valve piston 61 within the annular gasket 73.

The bore 75 in which the piston 64 operates opens at the face of the casing section 31 covered by the casing section 33 and a chamber 79 is thus formed between the piston 64 and the casing section 33. Interposed between the casing section 33 and the closed end of the hollow stem 76 of the piston 64 in the chamber 79 is a coil spring 81 which yieldingly urges the piston 64 upwardly to effect engagement of the upper end of the pin 78 with the face of the valve piston 61 and unseating of the valve piston 61 against the yielding resistance of the spring 74.

When the piston 64 is in its upper or raised position unseating the valve piston 61, it uncovers the opening of a passage 83 into the bore 75 at the lower side thereof, which passage 83 is connected to the chamber 66 and has a restriction or choke 82 therein.

When the straight-air pipe 14 is charged with fluid under pressure, fluid under pressure is supplied therefrom through the one section of the brake cylinder pipe 15 to the chamber 66 and then past the unseated valve piston 61, through the passage 69, chamber 67, passage 56, annular chamber 51, passage 52 and the other section of the brake cylinder pipe 15 to the brake cylinder 11. At the same time fluid under pressure is supplied through the passage 83 to the chamber 79 at the lower side of the piston 64. Accordingly, since opposite sides of piston 64 are subject to opposing pressures, spring 81 maintains the piston 64 in its normal or raised position unseating the valve piston 61.

Operation of the piston 64 downwardly is effected by a sudden rapid venting of fluid under pressure from chamber 79 at the lower side thereof resulting from unseating of the vent valve 39 of the release valve device 34. The outer seated area of the vent valve 39 within the bore 43 is connected to chamber 79 by a short passage 86 which opens into the bore 75 at a point adjacent the casing section 33. Thus when the chambers 67 and 79 on opposite sides of the piston 64 are both charged with fluid under pressure, the unseating of the vent valve 39 from its annular rib seat 47 vents fluid under pressure from chamber 79 at a rapid rate through the passage 86 and exhaust port 48. The higher fluid pressure in chamber 67 acting on the upper side of the piston 64 thus shifts the piston downwardly against the yielding resistance of the spring 81 and causes an annular rib 87 formed on the lower face of the piston 64 to engage in sealing relation a gasket seat formed on the gasket 33b between the casing sections 31 and 33. In shifting downwardly toward the gasket seat, the piston 64 passes the opening of the passage 83 and thus cuts off the supply of fluid under pressure from the chamber 66 into the chamber 79 and transfers it to the annular chamber 88 at the upper side of the piston 64, so that the combined pressures of the fluid in chambers 67 and 88 are effective over the entire upper face of piston and the closed end of stem 76 to thereafter urge the piston positively into seated position on its gasket seat. The passage 86 opens into the bore 75 sufficiently close to the casing section 33 that when the piston 64 is seated on the gasket seat 30 of the gasket 33 the passage 86 is not connected to the annular chamber but remains open to the outer seated area beneath the piston.

The exhaust valve 63 is of the poppet type and is contained in a chamber 89 formed in the casing section 33. Valve 63 is yieldingly urged upwardly into seated relation on an associated valve seat formed on the casing section 33 by a coil spring 91 interposed between the valve and a threaded plug 90 that is screwed into the outer open end of the chamber 89 and has a plurality of vent ports 92 therein. Valve 63 has a fluted stem 93 which is guided in a suitable bore connecting the chamber 89 and the chamber 79 at the lower side of the piston 64. The end of the fluted stem 93 projects into the chamber 79 and is engaged by the piston 64, at a point within the annular rib 87, so that when the piston shifts downwardly into seated position on the gasket seat of gasket 33b, valve 63 is unseated.

With the piston 64 seated on its gasket seat and the exhaust valve 63 unseated, the chamber 79 at the lower side of the piston 64 is isolated and vented to atmosphere past valve 63 and through the vent ports 92 independently of the vent valve 39 of the release valve device 34. It will thus be apparent that with the lower face of piston 64 maintained subject to only atmospheric pressure, the fluid pressure in chambers 67 and 88 on the upper face of the piston is effective to hold the piston in seated relation on its gasket seat thereafter as long as the force of the fluid pressure in chambers 67 and 88 is sufficient to overcome coil spring 81. The area of piston 64 and the strength of coil spring 81 is such that once the piston is seated on its gasket seat, spring 81 is ineffective to unseat the piston upwardly from its gasket seat until the fluid pressure in chambers 67 and 88 on the upper face of piston 64 reduces below a certain uniform low pressure, such as five pounds per square inch.

The sanding valve 62 is a double beat valve and it is arranged to be normally urged into seated relation on an associated upper valve seat by a coil spring 94 and shifted downwardly against the yielding resistance of the spring 94 into seated relation on a lower valve seat when the piston 64 is shifted downwardly to seated relation on its associated gasket seat. The sanding valve 62 is contained in a chamber 95 to which the timing reservoir 24 is constantly connected, as by a pipe and passage 96, and is guidably supported by means of an annular flange 97 formed thereon which slidably engages in a suitable bore 98 in the casing. The flange 97 of the valve 62 is provided with suitable grooves 99 therein so that when the valve 62 is in its upper seated position, communication is established between a chamber 101, to which the sanding reservoir 22 is constantly connected as through a pipe 102, and the chamber 95 whereby the timing reservoir 24 is charged to the pressure in the sanding reservoir 22.

The sanding reservoir 22 is constantly charged with fluid under pressure from the main reservoir 12, as through a branch pipe 103 connecting the main reservoir supply pipe 26 to the reservoir, a one-way or check valve 104 being interposed in the pipe 103 to prevent back flow of fluid under pressure from the sanding reservoir through pipe 103.

When the piston 64 is shifted downwardly into seated engagement on the gasket seat of the gasket 33 it engages the end of a plunger 105 which in turn engages a lug 106 formed on the sanding valve 62 so that when the piston 64 is seated on its gasket seat the sanding valve 62 is shifted from its upper seated position to its lower seated position. The plunger 105 carries thereon a valve 107 of the poppet type, and a coil spring 108 is interposed between the valve 107 and the sanding valve 62 in a chamber 109 for yieldingly urging the valve 107 into seated position on an associated valve seat when the sanding valve 62 is in its upper seated position. When the valve 107 is seated, it prevents leakage of fluid under pressure therepast through a bore 112 connecting the chambers 79 and 109 through which bore the plunger 105 extends. The plunger 105 is provided with a series of axially spaced piston ring flanges 111 which closely fit bore 112 so as to prevent leakage of fluid under pressure from the chamber 79 to the chamber 109 and vice versa, while valve 107 is unseated.

The sanding valve device 23 comprises a casing containing an operating piston 114 having at one side thereof a piston chamber 115, that is constantly connected to the chamber 109 of the control valve mechanism 16 as through a pipe and passage 116, and having at the opposite side thereof a chamber 117 which is constantly open to atmosphere through a port 118. Pipe 116 is open to atmosphere through a vent port having a choke 119 therein.

The piston 114 of the sanding valve device 23 is provided with a stem 121 which carries a valve 122 of the poppet type. The casing of the sanding valve device 23 has two spaced walls 123 and 124 therein, the wall 123 having a central opening through which the stem 121 of the piston extends in close-fitting slidable relation to prevent leakage of fluid under pressure along the stem 121 from a chamber 125, formed between the walls 123 and 124, to the atmospheric chamber 117. The wall 124 has a port 126 which connects the chamber 125 to a chamber 127 that is constantly charged with fluid under pressure from the sanding reservoir 22, as by a branch pipe 128 of the sanding reservoir pipe 102.

The valve 122 on the piston stem 121 is normally yieldingly urged in the right-hand direction, as seen in the drawing, into seated relation on an associated valve seat formed on wall 124 to close the port 126, by a coil spring 129 contained in the chamber 127 and interposed between the valve 122 and the casing.

A plurality of the sanding devices 21 are connected to the chamber 125 of the sanding valve device 23, as by connecting pipes 131.

It will accordingly be seen that when fluid under pressure is supplied to the piston chamber 115 of the sanding valve device 23, valve 122 is unseated and fluid under pressure is supplied therepast from the sanding reservoir 22 to the sanding devices 21 to effect sanding.

The magnet valve device 17 functions to control the exhaust communication for the chamber 44 at the upper side of the operating piston 37 of the release valve device 34 in the control valve mechanism 16. Magnet valve device 17 comprises a suitable casing containing a valve 135 of the poppet type, and an electromagnet winding or solenoid 136 effective, when energized, to actuate a plunger 137 which in turn unseats the valve 135 from an associated valve seat against the yielding resistance of a coil spring 138. The valve 135 is contained in a chamber 139 which is constantly connected as through a pipe 141 to the piston chamber 44 of the release valve device 34 in the control valve mechanism 16. Upon energization of the electromagnet winding 136 and unseating of the valve 135, communication is established past the valve 135 from piston chamber 44 and the chamber 139 to a chamber 142 which is constantly open to atmosphere through a port 143. Thus, as long as the electromagnet winding 136 is energized, the chamber 44 of the release valve device 34 is vented to atmosphere through the exhaust port 143 of the magnet valve device 17 and when the electromagnet winding 136 is deenergized the venting communication is closed.

The wheel-slip responsive device 18 is illustrative of any suitable device for effecting energization of the electromagnet winding 136 of the magnet valve device 17 instantaneously upon the slipping of a vehicle wheel with which it is associated. As shown, the wheel-slip responsive device 18 is of the type described and claimed in my copending application Serial No. 137,956, filed April 20, 1937, and issued as Patent 2,140,620.

Briefly, wheel-slip responsive device 18 comprises a tubular casing 145 in which is contained a rotary inertia element in the form of a fly-wheel 146, a driving shaft 147 for the fly-wheel and a switch device 148. The driving shaft 147 is supported at opposite ends thereof by ball bearings 149, one of the bearings being contained in the end cover 151 of the casing 145 and the other being slidably supported within a bore 152 formed in the laterally projecting hub portion 153 of the fly wheel 146.

The fly-wheel 146 is supported for rotation within the casing by a ball bearing 154 at the end of the hub portion 153, which bearing is arranged to move slidably in a bore 155 of the casing, and by another ball bearing 156 inset at the opposite end of the hub portion in a suitable recess formed in the face of the fly-wheel, which bearing is arranged to rotatably and slidably support the fly-wheel on the shaft 147.

Suitably fixed on the outer end of the shaft 147 which projects through the end cover 151 of the casing is a pulley 161 having an annular groove 162 therein for receiving an endless belt that connects the shaft to any rotary element, such as the wheel axle, that rotates according to the rotation of one of the vehicle wheels on which the brakes are applied by the brake cylinder 11.

The fly-wheel 146 is rotated by rotation of the shaft 147 through a clutch arrangement comprising a disc 163 fixed to the shaft, and a coil spring 164 so interposed between a collar or flange 165 on the shaft 147 and an annular shoulder 166 within the bore 152 of the hub portion 153 of the fly-wheel, as to urge the fly-wheel 146 and the disc 163 into interlocked or clutching engagement. Suitable thrust bearings 167 are provided for sustaining the axial thrust of the pulley 161 on the end cover 151 due to the force of the spring 164 and also the thrust of the spring 164 on the fly-wheel 146.

The disc 163 and the fly-wheel 146 are interlocked by means of a plurality of spaced pairs of complementary registering recesses 169 and 170, in the juxtaposed faces of the disc and fly-wheel, and a steel ball 171 in each pair of complementary recesses. Any suitable number of pairs of recesses 169 and 170 may be provided, arranged in spaced circumferential relation radially outward from the shaft 147. The recesses 169 and 170 are relatively short and curved uniformly about the axis of the shaft 147, so as to resemble somewhat the contour of a kidney bean, and vary in depth along the arc thereof with respect to the face of the disc or fly-wheel in which they are located, being deepest at the mid-point and sloping outwardly in opposite directions to the face of the disc or fly-wheel.

It will thus be seen that under the influence of spring 164 the steel balls 171 normally seat in the deepest portion of each pair of complementary recesses 169 and 170 so that the fly-wheel 146 and the disc 163 are accordingly normally interlocked for rotation together.

The compressive force or strength of the spring 164 is such as to maintain the fly-wheel 146 and disc 163 in interlocking engagement as shown, as long as the disc does not decelerate or accelerate with respect to the fly-wheel in excess of a certain rate, corresponding for example to a ten mile per hour per second rate of retardation or acceleration of the vehicle wheel driving the shaft 147. Such a high rate of acceleration or deceleration of the vehicle wheels will not occur during an application of the brakes except by exceeding the limit of adhesion between the vehicle wheel and its associated rail surface, that is, by slipping of the wheel.

When the shaft 147 decelerates at a rate corresponding to the deceleration of the vehicle wheel while slipping, the fly-wheel 146 tends to overrun or lead the shaft 147 and consequently shifts rotatively forward of its normal position with respect to the disc 163. When the shaft 147 accelerates according to the rate of acceleration of the vehicle wheel back toward a speed corresponding to vehicle or rail speed while slipping, the fly-wheel 146 tends to under-speed or lag behind the shaft 147 and consequently shifts rotatively backward of its normal position with respect to the disc 163.

In view of the steel balls 171 interposed between the disc 163 and the fly-wheel 146, the rotative shift of the fly-wheel 146 relative to the disc, either forwardly or backwardly of its normal position, causes the fly-wheel 146 to be shifted axially in the right-hand direction against the yielding resistance of the spring 164.

The degree of rotative shift of the fly-wheel 146 relative to the disc 163 is limited to a degree which prevents the steel balls 171 from leaving the complementary recesses 169 and 170, as by one or more pins (not shown) in the disc or fly-wheel cooperating with arcuate slots or grooves (not shown) in the fly-wheel or disc, in the manner shown and described in my above-mentioned copending application.

The switch device 148 of the wheel-slip responsive device 18 comprises a pair of flexible resilient contact fingers 175 and 176, each of which is fixed at one end to an insulating member 177 secured within the casing 145 at the end of the hub portion 153 of the fly-wheel. The contact fingers 175 and 176 are disposed in spaced parallel relation in alignment with the axis of the shaft 147, the free ends of the contact fingers being normally disengaged from each other. When the fly-wheel 146 is shifted in the right-hand direction, as a result of shifting rotatively relative to the disc 163, the closed end of the hub portion 153 of the fly-wheel engages the free end of a resilient spring member 178, fixed at its opposite end in the insulating member 177 in alignment with the contact fingers 175 and 176, and bends it laterally against the contact finger 175 which is, in turn, bent into contact with the contact finger 176. A tip 179 of insulating material is provided on spring member 178 for preventing the grounding of the contact fingers 175 and 176 to the casing.

The pressure operated switch 19 functions jointly with the switch device 148 of the wheel-slip responsive device 18 to control energization and deenergization of the electromagnet winding 136 of the magnet valve device 17. As shown diagrammatically, the pressure switch 19 comprises a casing having a piston 181 for operating a switch member 182 into and out of contact with a pair of contact members 183, suitably carried in insulated relation on the casing. The switch member 182 is carried in insulated relation on a stem 184 of the piston 181, and a coil spring 185 interposed between piston 181 and the casing yieldingly urges the piston 181 downwardly to a limit position in which the switch member 182 disengages the contact members 183. Formed in the casing at the side of the piston 181 opposite the spring 185 is chamber 186 which is connected to the straight-air pipe 14 at a point adjacent the brake valve 13 through a branch pipe 187.

The strength of the spring 185 is such that when the fluid pressure established in the straight-air pipe 14 and effective in the chamber 186 on the piston 181 exceeds a relatively low pressure, such as five pounds per square inch, the resisting force of the spring is overcome and the piston 181 is shifted upwardly to effect engagement of the switch member 182 with the contact members 183.

The electro-magnet winding 136 of the magnet valve device 17 is energized by current supplied from a suitable source, such as a storage battery 189, which may be the storage battery for the lighting system on the cars of the train, under the joint control of the switch device 148 of the wheel-slip responsive device 18 and the pressure switch 19. The control circuit for the electro-magnet winding 136 needs no description for, as clearly seen in the drawing, the magnet winding 136, the switch device 148 of the wheel-slip responsive device 18 and the pressure switch 19 are connected in series relation across the terminals of battery 189.

Operation of equipment

The main reservoir 12 is charged to the normal pressure carried therein, as from a fluid compressor not shown, in the usual manner. The sanding reservoir 22 is charged to the pressure in the main reservoir 12 through the branch pipe 103 and the timing reservoir 24 is also correspondingly charged with fluid under pressure past the sanding valve 62 of the control valve mechanism 16 which is in its normal upper seated position.

Let it now be assumed that a car or train is traveling along the road under power or coasting and that the equipment is conditioned as shown in the drawing, the brakes being released. To effect an application of the brakes, the operator first cuts off the propulsion power, if the power is on, and then shifts the brake valve handle 25 out of its normal release position into the application zone an amount corresponding to the desired degree of application of the brakes. The straight-air pipe 14 is accordingly charged with fluid under pressure from the main reservoir 12 to a degree corresponding to the position of the brake valve handle in the application zone and fluid under pressure is accordingly supplied from the straight-air pipe 14 through brake cylinder pipe 15, chamber 66 of the control valve mechanism 16, past the unseated valve piston 61, passage 69, chamber 67, supply passage 56, annular chamber 51, passage 52, and brake cylinder pipe 15 to the brake cylinder 11. Accordingly, the fluid pressure established in the brake cylinder 11 corresponds to that established in the straight-air pipe 14 and the brakes are thus applied to a degree corresponding to the position of the brake valve handle 25.

As long as the degree of application of the brakes, as determined by the pressure in the brake cylinder 11 is not sufficient to cause slipping of the wheels with which the brake cylinder 11 is associated, the control valve mechanism 16 remains conditioned as shown in the drawing, and the operator may shift the brake valve handle 25 as desired to correspondingly control the pressure in the brake cylinder to secure any desired degree of application of the brakes.

In the event, however, that a wheel on which the brakes are applied by the brake cylinder 11 begins to slip due to the application of the brakes, the wheel-slip responsive device 18 operates in the manner previously described to close its switch device 148 which completes the circuit for energizing the electro-magnet winding 136 of the magnet valve device 17, it being understood that the pressure switch 19 has previously been actuated into circuit-closing position due to the pressure established in the straight-air pipe 14.

Valve 135 of the magnet valve device 17 is accordingly unseated to establish the exhaust passage for venting fluid under pressure from the piston chamber 44 above the piston 37 of the release valve device 34. Piston 37 is accordingly shifted upwardly into seated engagement on its gasket seat and the piston chamber 44 is accordingly disconnected from the passage 53 and isolated at atmospheric pressure. At the same time, the vent valve 39 is unseated upwardly to exhaust fluid under pressure from the brake cylinder 11 through the exhaust port 48, and the piston 41 of the release valve device 34 cuts off communication from the supply passage 56 to the annular chamber 51 and connected brake cylinder 11.

It will thus be seen that the release valve device 34 is operated instantly in response to the initiation of slipping of the vehicle wheels to cut off the further supply of fluid under pressure to the brake cylinder 11 and to vent fluid under pressure at a rapid rate from the brake cylinder. Inasmuch as the chamber 44 above the piston 37 of the release valve device 34 is isolated at atmospheric pressure and brake cylinder pressure is effective in the annular chamber 51 on the lower face of the piston 37, the piston is maintained seated on its gasket seat until the pressure in the brake cylinder reduces below the relatively low uniform pressure of five pounds per square inch, as previously explained.

The vent valve 39 of the release valve device 34 is effective when unseated to vent the chamber 79 at the lower side of the piston 64 of the reapplication valve device 35, and accordingly the piston 64 is actuated downwardly into seated relation on the gasket 33b. The valve piston 61 is thus shifted into seated relation on the annular rib seat 72 to prevent the supply of fluid under pressure from the straight-air pipe 14 through the passage 69 to the chamber 67 and supply passage 56. Also, the exhaust valve 63 is unseated and the sanding valve 62 shifted from its upper seated position to its lower seated position.

It will be apparent that the piston 64, in shifting downwardly to seated position on its gasket seat, passes the passage 83 and thus causes the straight-air pipe pressure to become effective through the passage 83 in the annular chamber 88 on the upper face of the piston 64. At the same time, the isolation of the piston chamber 79 is effected by engagement of the annular rib 87 on the piston with the gasket seat and the unseated exhaust valve 63 maintains the piston chamber 79 at atmospheric pressure. Thus, as long as the pressure in the straight-air pipe thereafter effective in the annular chamber 88 on the upper side of the piston 64 exceeds the relatively low uniform value sufficient to overcome the force of the spring 81, the piston 64 is maintained in seated engagement on its gasket seat.

With the sanding valve 62 seated on its lower valve seat, communication is cut off between the sanding reservoir 22 and the timing reservoir 24, and communication is established past the upper valve seat through which fluid under pressure is supplied from the timing reservoir 24 to the piston chamber 115 of the sanding valve device 23. The piston 114 is accordingly shifted in the left-hand direction to unseat the valve 122, which opens communication through which fluid under pressure is supplied from the sanding reservoir 22 to the sanding devices 21, to cause sanding of the rails adjacent the slipping wheels as long as the valve 122 is unseated.

The time that the valve 122 is unseated is limited, however, due to the exhaust of fluid under pressure from the piston chamber 115 at a restricted rate through the exhaust choke 119 in the pipe 116. The capacity of the timing reservoir 24 and size of the choke 119 may be so related as to maintain the valve 122 unseated for any desired length of time, as for example, the length of time required to bring a car or train to a complete stop, or a shorter interval of time. In any event, when the pressure in the piston chamber 115 is reduced sufficiently due to the escape of fluid under pressure through the choke 119, the spring 129 becomes effective to reseat the valve 122 and thus cut off the further supply of fluid under pressure from the sanding reservoir 22 to the sanding devices 21, thus terminating the sanding of the rails.

Assuming that the retarding force on the slipping wheels is relaxed correspondingly to the rapid reduction in brake cylinder pressure, the vehicle wheels cease deceleration and begin to accelerate back toward a speed corresponding to vehicle or rail speed when the brake cylinder pressure has reduced a relatively small amount from that which initiated the slipping. Since a slipping vehicle wheel accelerates very rapidly back toward vehicle or rail speed once it starts such acceleration, it will be apparent that the slipping vehicle wheels will return to a speed corresponding to vehicle or rail speed before the pressure in the brake cylinder 11 is reduced sufficiently to permit the spring 45 of the release valve device 34 to actuate the piston 37 and vent valve 39 thereof downwardly to reseat the vent valve 39 and reestablish the supply communication to the brake cylinder 11. It will thus be seen that reapplication of the brakes associated with a wheel which has slipped is held off or prevented until the wheel has fully returned to vehicle or rail speed.

In some instances, it may happen that the reduction of the retarding force on a slipping wheel is not effected correspondingly to the reduction in brake cylinder pressure and that a considerable amount of reduction in brake cylinder pressure is required before the retarding force is reduced. In such cases, the vehicle wheel may reduce to a relatively low speed while slipping, and thus the time interval between the initiation of slipping and the return to vehicle or rail speed may be greater. In order, therefore, to prevent the immediate and rapid restoration of pressure in the brake cylinder, in such instances, which might result in recurrence of slipping of the wheels, the reapplication valve device 35 functions to restrict the rate of resupply of fluid under pressure to the brake cylinder upon restoration of the release valve device 34 to its normal position.

It will be apparent that, since the piston 64 of the reapplication valve device 35 is maintained downwardly in seated position on its gasket seat, the stem 78 is retracted downwardly, and thus the valve piston 61 is maintained seated to close communication through the passage 69. Thus, when the release valve device 34 is returned downwardly to the normal position shown in the drawing to reestablish the supply communication to the brake cylinder 11, fluid under pressure can be resupplied to the brake cylinder from straight-air pipe 14 only at the restricted rate determined by the size of the choke element 71.

It will be seen that the reestablishment of the supply communication to the brake cylinder 11 tends to cause a reduction of the pressure in the straight-air pipe 14 due to the flow of fluid under pressure from the straight-air pipe through the choke 71 and brake cylinder pipe 15 to the brake cylinder 11. Accordingly, the brake valve 13 functions automatically upon the restoration of the release valve device 34 to its normal position, to maintain the pressure in the straight-air pipe 14 at a pressure corresponding to the position of the brake valve handle 25, so that the ultimate degree of pressure reestablished in the brake cylinder 11 corresponds to the position of the brake valve handle 25. However, due to the restricted rate of supply of the brake cylinder 11 through the choke 71, the pressure in the brake cylinder 11 is restored at a slow rate and thus sufficient pressure to cause recurrence of wheel slipping is not reestablished in the brake cylinder before the slipping vehicle wheel returns fully to vehicle or rail speed.

For well known reasons, the engineman on a train reduces the degree of application of the brakes, as the speed of the car or train reduces in order to cause retardation of the train at a more uniform rate throughout the stopping distance. Accordingly, assuming that the operator shifts the brake valve handle 25 towards release position from the initial position in the application zone, it will be apparent that the pressure ultimately restored in the brake cylinder 11 following return of the slipping wheel to vehicle or rail speed will be less than that which initiated the slipping of the wheel, thus further minimizing the possibility of recurrence of wheel slipping.

It will be apparent that once the wheel-slip responsive device 18 operates in response to the initiation of slipping of a vehicle wheel, the control valve mechanism 16 is thereafter unaffected by variations in the rotative condition of a slipping wheel, as when it ceases to decelerate and begins to accelerate back toward a speed corresponding to vehicle or rail speed. When the vehicle wheel ceases to decelerate and begins to accelerate while slipping, the fly-wheel 146 of the wheel-slip responsive device 18 is returned momentarily to its normal position, in which the contact fingers 175 and 176 of the switch device 148 are separated, thus effecting deenergization of the electro-magnet winding 136 of the magnet valve device 17. Due to the fact that the brake cylinder pressure effective in the annular chamber 51 on the lower face of the piston 37 of the release valve device 34 maintains the piston in seated relation of its gasket seat, such momentary separation of the contact fingers 175 and 176 of the wheel-slip responsive device 18 is without effect. Furthermore, as long as the vehicle wheel is accelerating back toward a speed corresponding to vehicle or rail speed, while slipping, at a rate in excess of ten miles per hour per second, the contact fingers 175 and 176 remain in engagement. Thus, while the vehicle is so accelerating, the valve 135 of the magnet valve device 17 continues to establish the venting communication for the chamber 44 above the piston 37 of the release valve device 34.

It will thus be seen that the wheel-slip responsive device 18 is in the nature of a trigger mechanism which sets the control valve mechanism 16 into operation, the valve mechanism 16 functioning automatically, once it is set into operation, independently of further operation of the wheel-slip responsive device 18 during any one slipping cycle.

In the event that a vehicle wheel should again begin to slip upon reapplication of the brakes thereon in the manner previously described, the wheel-slip responsive device 18 again operates to vent the piston chamber 44 of the release valve device 34 and cause the release valve device 34 to cut off the supply of fluid under pressure to the brake cylinder and vent fluid under pressure rapidly therefrom. Since in such case, the piston 64 of the reapplication valve device 35 is still in its lower seated position on the gasket seat, the unseating of the vent valve 39 is ineffective to cause operation of the reapplication valve device 35. However, upon the subsequent reseating of the vent valve 39 following sufficient reduction of brake cylinder pressure, the reapplication valve device 35 is conditioned as before to restrict the rate of resupply of fluid under pressure to the brake cylinder 11.

Obviously, when the timing reservoir 24 is of sufficient capacity to insure the continued sanding of the rails throughout a brake application, the recurrence of wheel slipping during any one application is exceedingly unlikely.

When the car or train is brought to a complete stop, the operator may shift the brake valve handle 25 to increase the pressure in the straight-air pipe and thus in the brake cylinder 11 to increase the degree of application of the brakes, as desired, to hold the car or train on any grade that may be encountered in service.

When it is desired to release the brakes prior to again starting the train, the operator merely shifts the brake valve handle 25 to release position, thus completely venting fluid under pressure from the straight-air pipe 14 and connected brake cylinder 11 to atmosphere and effecting the complete release of the brakes.

It will be apparent that when the pressure in the annular chamber 88, acting to maintain the piston 64 of the reapplication valve device 35 in its lower seated position on its gasket seat, is reduced sufficiently due to the reduction of the pressure in the straight-air pipe 14, the spring 81 becomes effective to shift the piston 64 upwardly to its normal position unseating the valve piston 61 from the annular rib seat 72 to restore the communication through the passage 69 between the chambers 66 and 67, thus restoring the valve mechanism 16 to its normal condition for another operation thereof. When the piston 64 of the reapplication valve device 35 is shifted upwardly to its normal position, the exhaust valve 63 is reseated to cut off the exhaust communication for the chamber 79 and, at the same time, the sanding valve 62 is returned upwardly to its upper seated position restoring the charging communication between the sanding reservoir 22 and the timing reservoir, so that the timing reservoir 24 is again recharged to the normal pressure carried therein.

It will be apparent that if the wheel-slip responsive device 18 is associated with a traction wheel and axle unit and excessive propulsion force is applied to the traction wheel upon starting of the car or train sufficient to cause racing thereof, the contact fingers 175 and 176 of the switch device 148 thereof will be shifted into engagement with each other. However, with the brakes released, the pressure switch 19 is in circuit-opening position so that the closing of the switch device 148 under such condition is ineffective to cause energization of the magnet winding 136 of the magnet valve device 17. Unnecessary consumption of current from the battery 189 is thus avoided.

In the case of a train brake equipment, it should be understood that the different brake cylinders along the length of the train on the various cars are controlled by equipment duplicating that described for the brake cylinder 11 and, therefore, while the brake valve 13 is effective under the control of the operator to control the application and release of all the brakes throughout the train, the various control valve mechanism 16 and sanding valve devices 23 local to each brake cylinder, are automatically controlled to provide individual control of one or more wheel and axle units in response to the slipping of the wheels thereof.

*Summary*

Summarizing, it will be seen that I have disclosed a fluid pressure brake equipment for vehicles, such as railway cars and trains, operative to prevent sliding of the vehicle wheels. The invention comprises essentially a control valve mechanism including a release valve device, a reapplication valve device, and a sanding valve adapted to be set in operation by a suitable wheel-slip responsive device in response to the initiation of slipping of the vehicle wheels. The release valve device functions automatically to cut off the supply of fluid under pressure to the brake cylinder and to rapidly vent pressure from the brake cylinder and to continue to vent fluid under pressure from the brake cylinder as long as the pressure therein exceeds a certain uniform low pressure such as five pounds per square inch. The reapplication valve device is automatically operated in response to the operation of the release valve device to prevent more than a restricted rate of resupply of fluid under pressure to the brake cylinder when the release valve device is restored to its normal condition. The reapplication valve device is automatically held in its rate restricting position, once it is operated thereto, until the brakes are released.

The sanding valve is operated by the reapplication valve device to initiate sanding of the rails, the sanding being automatically timed to terminate after a certain uniform time, preferably sufficient to bring the train to a complete stop.

While I have illustrated and described only one embodiment of my invention, it will be apparent that various omissions, additions, or modifications may be made therein without departing from the spirit of my invention. For example, it will be apparent that, if desired, the sanding valve 62 of the control valve mechanism 16 may be omitted, if the sanding operation is not desired. It is accordingly not my intention to limit the scope of my invention except as it is necessitated by the scope of the prior art.

Having now described my invention, what I claim as new and desire to secure by Letters Patent is:

1. A valve mechanism for use in vehicle brake equipment of the type having a brake cylinder to which fluid under pressure is supplied to effect application of the brakes and from which fluid under pressure is released to effect release of the brakes, comprising fluid pressure operated valve means including a movable abutment having a normal position in which it is subject on one side to the pressure in the brake cylinder and on the opposite side to the pressure in a chamber, means for charging said chamber with fluid under pressure at a sufficiently rapid rate when fluid under pressure is supplied to the brake cylinder to prevent movement of the movable abutment out of its normal position, said movable abutment being shifted out of its normal position to a different position in response to a sudden reduction of pressure in said chamber during an application of the brakes, and being effective in its said different position to prevent the further supply of fluid under pressure to said chamber so that it is maintained thereafter in its said different position by brake cylinder pressure as long as the pressure in the brake cylinder exceeds a certain uniform pressure, said valve means being effective when the said abutment is in its said different position to prevent the supply of fluid under pressure to the brake cylinder and to vent fluid under pressure from the brake cylinder.

2. A valve mechanism for use in vehicle brake equipment of the type having a brake cylinder to which fluid under pressure is supplied to effect application of the brakes and from which fluid under pressure is released to effect release of brakes, comprising valve means including a movable abutment having a normal position in which it is subject on one side to the pressure of fluid in the brake cylinder and on the opposite side to the pressure in a chamber, means providing a restricted communication between the brake cylinder and said chamber whereby, upon the supply of the fluid under pressure to the brake cylinder, said chamber is charged with fluid under pressure supplied to the brake cylinder at a sufficiently rapid rate that said movable abutment is unresponsive to the pressure of fluid supplied to the brake cylinder, said movable abutment being operative in response to a sudden reduction of pressure in the chamber to a different position in which said chamber is isolated from the brake cylinder and thereafter so responsive to the pressure in the brake cylinder as to be maintained in its said different position as long as the pressure in the brake cylinder exceeds a certain uniform pressure, said valve means being effective when the abutment is in its said different position to prevent the supply of fluid under pressure to the brake cylinder and to vent fluid under pressure from the brake cylinder.

3. A valve mechanism normally providing a communication through which fluid under pressure may be supplied, said valve mechanism including a movable abutment having a normal position in which it is subject in opposing relation to the pressure in the communication and in a chamber whereby said abutment is unresponsive to the pressure in the communication, said movable abutment being operative from its normal position to a different position in response to a sudden rapid reduction of pressure in said chamber, means effective when the abutment is in its said different position for isolating said chamber, and means effective when the abutment is in its said different position for venting fluid under pressure from said chamber whereby said abutment is maintained in its said different position by the pressure in the communication as long as the pressure in the communication exceeds a certain uniform pressure, said valve mechanism being effective when the abutment is in its said different position to close the said communication.

4. A valve mechanism including valve means normally effective to provide communication through which fluid under pressure may be supplied at a relatively unrestricted rate and a movable abutment for effecting operation of said valve means to a different position in which it is effective to provide communication through which fluid under pressure may be supplied at only a relatively restricted rate, said abutment having a normal position in which it is subject to the opposing pressures of the fluid in the said communication and in a chamber when fluid under pressure is supplied through the communication and operatively responsive to a sudden rapid reduction of the pressure in the said chamber to a different position to cause operation of the said valve means to its different position, means for isolating said chamber when the said abutment is in its said different position, and means effective to vent fluid under pressure from the said chamber when the said abutment is in its said different position whereby the pressure of the fluid in the said communication is effective to maintain the said abutment in its said different position as long as the pressure in the said communication exceeds a certain uniform pressure.

5. A valve mechanism comprising a casing having a communication therein including two parallel-related passages, one of which is of relatively large flow area and the other of which is of relatively small flow area, a valve for controlling the flow of fluid under pressure through the relatively large passage, a movable abutment for operating said valve, resilient means normally effective to urge said abutment to a position in which it operates the said valve to a position in which the relatively large communication is open, said abutment being subject in opposing relation to the pressure in the communication and in a chamber supplied with fluid under pressure from the communication whereby said abutment is normally unresponsive to the pressure of fluid supplied through the communication, means for effecting a sudden rapid reduction of the pressure in said chamber when the abutment is in its normal position whereby said abutment is shifted by the pressure of the fluid in the communication to a different position in which the said chamber is isolated from the said communication, and an exhaust valve effective to vent fluid under pressure from said chamber independently of said last means when the said abutment is in its said different position whereby said abutment is maintained in its said different position by the pressure in the said communication as long as the pressure in the communication exceeds a certain uniform pressure, said valve being operated to a position for closing the relatively large passage when the said abutment is in its said different position.

6. A valve mechanism comprising a casing having a communication through which fluid under pressure may be supplied, and two serially-related valve devices for controlling the flow of fluid under pressure through the communication, one of said valve devices having a normal position in which said communication is open and a different position in which said communication is closed, and the other of said valve devices having a normal position in which it permits a relatively unrestricted flow of fluid under pressure through the communication and a different position in which it restricts the flow of fluid under pressure through such communication, said one valve device being effective when operated to its different position to effect operation of the other of said valve devices to its different position.

7. A valve mechanism comprising a casing having a communication through which fluid under pressure may be supplied, and two serially-related valve devices for controlling the flow of fluid under pressure through the communication, one of said valve devices having a normal position in which said communication is open and a different position in which said communication is closed, and the other of said valve devices having a normal position in which it permits a relatively unrestricted flow of fluid under pressure through the communication and a different position in which it restricts the flow of fluid under pressure through such communication, said one valve device being effective when operated to its different position to effect operation of the other of said valve devices to its different position, and means effective when the said other valve device is in its said different position to maintain it in its said different position after the said one valve device is returned to its normal position.

8. A valve mechanism comprising a casing having a communication through which fluid under pressure may be supplied, and two serially-related valve devices for controlling the flow of fluid under pressure through the communication, one of said valve devices having a normal position in which said communication is open and a different position in which said communication is closed, and the other of said valve devices having a normal position in which it permits a relatively unrestricted flow of fluid under pressure through the communication and a different position in which it restricts the flow of fluid under pressure through such communication, said one valve device being effective when operated to its different position to effect operation of the other of said valve devices to its different position, and means effective when the said other valve device is operated to its said different position for causing it to be maintained in its said different position as long as the pressure in the said communication exceeds a certain uniform pressure.

9. A valve mechanism comprising a casing having a communication through which fluid under pressure may be supplied, and two serially-related valve devices for controlling the flow of fluid under pressure through the communication, one of said valve devices having a normal position in which said communication is open and a different position in which said communication is closed, and the other of said valve devices having a normal position in which it permits a relatively unrestricted flow of fluid under pressure through the communication and a different position in which it restricts the flow of fluid under pressure through such communication, said one valve device being effective when operated to its different position to effect operation of the other of said valve devices to its different position, said other valve device being so constructed and arranged as to be maintained in its different position by the pressure of the fluid in the said communication, even though the said one valve device returns to its normal position, as long as the pressure in the said communication exceeds a certain uniform pressure.

CLYDE C. FARMER.